United States Patent
Wilson et al.

(10) Patent No.: US 8,471,868 B1
(45) Date of Patent: Jun. 25, 2013

(54) PROJECTOR AND ULTRASONIC GESTURE-CONTROLLED COMMUNICATOR

(75) Inventors: Thomas Henry Wilson, Overland Park, KS (US); Carl Persson, Olathe, KS (US); Ken W. Heitland, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1532 days.

(21) Appl. No.: 11/946,095

(22) Filed: Nov. 28, 2007

(51) Int. Cl.
*G09G 5/00* (2006.01)
*G06F 3/033* (2006.01)

(52) U.S. Cl.
USPC .................. 345/633; 345/156; 345/158

(58) Field of Classification Search
USPC .................. 345/157, 177; 715/863
See application file for complete search history.

(56) References Cited

U.S. PATENT DOCUMENTS

| | | | | |
|---|---|---|---|---|
| 4,862,152 A * | 8/1989 | Milner | ................ | 345/158 |
| 5,107,746 A * | 4/1992 | Bauer | ................ | 84/626 |
| 5,144,594 A * | 9/1992 | Gilchrist | ................ | 367/129 |
| 6,160,899 A * | 12/2000 | Lee et al. | ................ | 382/103 |
| 6,380,923 B1 * | 4/2002 | Fukumoto et al. | ............ | 345/156 |
| 6,771,294 B1 * | 8/2004 | Pulli et al. | ................ | 715/863 |
| 7,834,850 B2 * | 11/2010 | Boillot et al. | ................ | 345/158 |
| 2003/0184575 A1 * | 10/2003 | Reho et al. | ................ | 345/714 |
| 2004/0070563 A1 * | 4/2004 | Robinson | ................ | 345/156 |
| 2006/0077175 A1 * | 4/2006 | Pilu | ................ | 345/156 |
| 2007/0130547 A1 * | 6/2007 | Boillot | ................ | 715/863 |
| 2008/0044005 A1 * | 2/2008 | Johnston | ................ | 379/433.01 |

OTHER PUBLICATIONS

Proceedings of the second IEEE and ACM International Symposium on Mixed and Augmented Reality (ISMAR''03) "A Wearable Mixed Reality with an On-board Projector" (2003) by Toshikazu Karitsuka and Kosuke Sato.*

* cited by examiner

*Primary Examiner* — Bipin Shalwala
*Assistant Examiner* — Benyam Ketema (57) ABSTRACT

System, methods, and computer-readable media for providing a gesture-controlled user interface in interacting with a communication device are provided. Embodiments of the present invention include a communication device that recognizes a gesture made by a person that has one or more transducers attached to their hand. The gesture is recognized by performing calculations on the sound waves received from the one or more transducers. In addition, the gesture may be recognized using a digital camera and image recognition techniques. In one embodiment, the gesture is recognized using an echolocation system that transmits ultrasonic waves and captures the waves reflected off the object making the gesture. In another embodiment, the gesture is made and interpreted in relation to a user interface that is projected from the communication device using a laser projector.

20 Claims, 8 Drawing Sheets

PROJECTOR AND ULTRASONIC GESTURE-CONTROLLED COMMUNICATOR

CROSS-REFERENCE TO RELATED APPLICATIONS

Not applicable.

SUMMARY OF THE INVENTION

The present invention is defined by the claims below. Embodiments of the present invention provide a communication device that includes a gesture-controlled user interface.

In a first illustrative embodiment, one or more computer-readable media having computer-executable instructions embodied thereon for performing a method of providing a gesture-controlled user interface in interacting with a communication device that includes a microphone array and a laser projector, is set forth. The method includes receiving one or more microphone-array signals from the microphone array that are communicating a representation of one or more sound waves received from one or more transducers utilized by a user to perform a gesture. The one or more transducers are positioned remotely from the communication device and are capable of being removably attached to the user. The method also includes identifying the gesture using at least the one or more microphone-array signals, assigning a meaning with communicative value to the gesture, and storing the meaning in a data store.

In another illustrative embodiment, a communication device with a gesture-controlled user interface is provided. The communication device includes a laser projector capable of displaying a user interface on a surface positioned remotely from the communication device. The communication device also includes a microphone array capable of receiving one or more sound waves transmitted from one or more transducers positioned remotely from the communication device and are capable of being removably attached to a user. The communication device further includes a gesture interpretation component that evaluates the one or more sound waves received by the microphone array and interprets a gesture made by the user. The user performs the gesture with the one or more transducers removably attached to the user.

In yet another illustrative embodiment, one or more computer-readable media having computer-executable instructions embodied thereon for performing a method of controlling a communication device having a laser projector, a microphone array, a digital camera, and an echolocation subsystem using gestures, is provided. The method includes receiving one or more microphone-array signals from the microphone array that represent one or more sound waves sent by one or more transducers that are utilized by a user to perform a gesture. The one or more transducers are positioned remotely from the communication device. The method also includes receiving an echolocation signal from the echolocation subsystem, receiving picture data from the digital camera, and projecting a display-type user interface using a laser projector onto a surface that is positioned remotely from to the communication device. The system further includes interpreting the gesture performed by the user using one or more of the one or more microphone-array signals, the echolocation signal, and the picture data, wherein the gesture is performed in relation to the display-type user interface projected by the laser projector.

BRIEF DESCRIPTION OF THE SEVERAL VIEWS OF THE DRAWINGS

The present invention is described in detail below with reference to the attached drawing figures, wherein.

DETAILED DESCRIPTION

The present invention will be better understood from the detailed description provided below and from the accompanying drawings of various embodiments of the invention, which describe, for example, media for enabling a communication device to provide a gesture interface. The detailed description and drawings, however, should not be read to limit the invention to the specific embodiments. Rather, these specifics are provided for explanatory purposes that help the invention to be better understood.

The present invention relates to providing a gesture interface to interface with a communication device. The communication device may be capable of being worn by a user. A user interface may be projected by the communication device using a laser projector. The projected user interface may be informational, or interactive. The interactive user interface supports user interaction therewith via the user making gestures in relation to the user interface. A hand movement is an example of a gesture. In order to better detect the gesture, one or more transducers may be attached to the user's hand. The gesture may also be detected by, or in combination with, a digital camera, and/or echolocation subsystem that may also be included on the communication device. The communication device may be configured to take digital pictures using gesture controls. In one embodiment, the user interface is controlled by moving the surface onto which the user interface is projected.

As one skilled in the art will appreciate, embodiments of the present invention may be embodied as, among other things: a method, system, or computer-program product.

Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
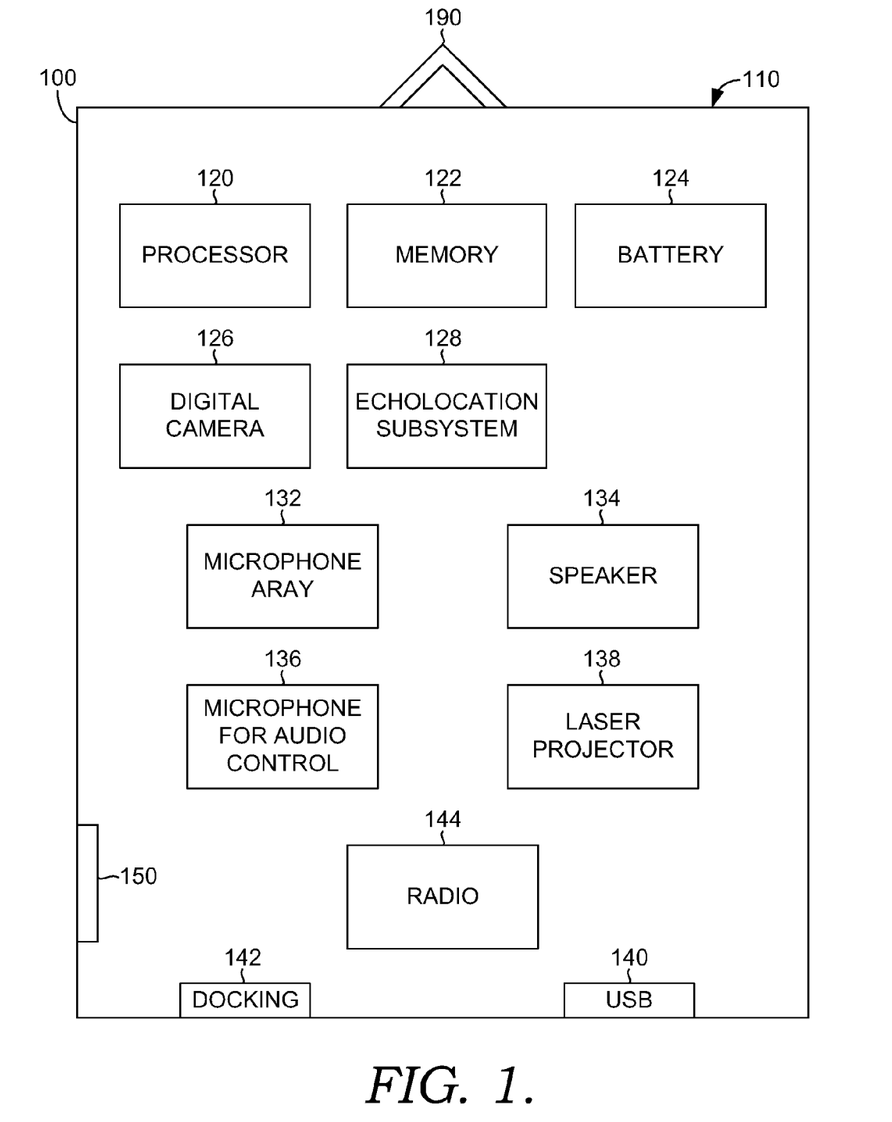
FIG. 1 is a block diagram of a communication device including components suitable for implementing embodiments of the present invention.

Referring to the drawings in general, and initially to FIG. 1 in particular, a communication device with components suitable for implementing embodiments of the present invention is shown and designated generally as communication device 100. Communication device 100 is but one example of a suitable communication device and is not intended to suggest any limitation as to the scope or use of functionality of the invention. Neither should the communication device 100 be interpreted as having any dependency or requirement related to any one or combination of components illustrated.

With continued reference to FIG. 1, the communication device 100 includes one or more processors 120, a memory 122, an illustrative power supply such as a battery 124, a digital camera 126, an echolocation system 128, a microphone array 132, a speaker 134, an audio-control microphone 136, a laser projector 138, I/O ports such as USB slot 140 and docking station port 142, a radio 144, a removable memory slot 150, and an attachment ring 190. All of the aforementioned components within communication device 100 may be enclosed in a case 110. The various components within communication device 100 may be connected by one or more buses (not shown).

The processor 120 is configured to process data to enable the software and hardware on the communication device 100 to provide the functionality described hereafter. The processor 120 should be chosen for its combination processing ability and low power consumption. The Texas Instruments OMAP processor series is one example of a suitable processor for use within communication device 100.

The memory 122 includes computer storage media in the form of volatile and/or non-volatile memory. The memory may be removable, non-removable, or a combination thereof. Exemplary hardware devices include solid-state memory, hard drives, optical-disk drives, etc. In one embodiment, 64 MB of RAM memory is provided. Additional external memory, such as a memory card, may be provided through removable memory slot 150.

The battery 124 is configured to provide a power source to the communication device 100. In one embodiment, a light weight, rechargeable battery 124 that maintains charge when the communication device 100 is powered off is used. In one embodiment, a lithium-ion battery with nominal cell voltage of 3.7 v is used. A recharging port may be provided on communication device 100 to recharge the battery 124. The battery 124 may also be recharged through the docking port 142. In another embodiment, disposable batteries may be used to power the communication device 100. Any suitable power source may be used.

The digital camera 126 is functional to capture digital images. In one embodiment, the digital camera 126 has a 4× zoom. The digital camera 126 needs to be compatible with the processor 120 and other components chosen to be included within communication device 100. In one embodiment, the digital camera 126 includes a Kodak CMOS image sensor.

The microphone array 132 is configured to receive ultrasonic waves sent from one or more ultrasonic transducers. The microphone array 132 consists of two or more ultrasonic microphones installed in communication device 100. The position of a remotely positioned transducer may be determined by calculating the amount of time it takes the ultrasonic waves to travel from the transducer to the microphone array 132. Increased accuracy of the measurements and estimates of the three dimensional position of the remotely positioned transducer may be increased by using more than one ultrasonic microphone. By establishing a known, fixed physical relationship in space between the different individual microphones within the microphone array 132, the simultaneous processing of the sound waves received by the array microphones allows where the position of the broadcasting transducers to be calculated with great accuracy. The sound waves are used to calculate coordinate information that represents the position and movements of the transducers and allows patterns to be recorded and recognized by the communication device 100. In one embodiment, the array microphones are constructed of piezoelectric ceramic material. In one embodiment, the microphone array 132 includes four microphones, one installed near each corner of communication device 100. Mounting the array microphones at each corner creates the maximum differential sampling and, therefore, the best accuracy. The microphones are all mounted facing the same direction. This creates an area in front of the microphone array 132 in which transducer movement may be used to communicate with and/or control the communication device 100.

The echolocation subsystem 128 is configured to determine the size, location, and movement of objects near the communication device 100. The echolocation subsystem 128 includes a transducer that emits ultrasonic waves and one or more ultrasonic speakers to capture the ultrasonic waves transmitted from the ultrasonic speaker and reflected off one or more objects. The echolocation subsystem 128 is capable of calculating the size, distance, and movement of an object by performing calculations on the sound waves that are reflected off the object. For example, the subsystem transducer may emit ultrasonic waves toward the front of the communication device while the user is performing a gesture. Some of the waves will be reflected (echo) off of the object that is being used to perform the gesture and received by the subsystem's microphone. The distance between the object and the transducer may be determined based on the time it took the sound waves to travel to the object and back. The change in this calculation over time allows the object's movement to be calculated. Finally, the object's shape can be determined based on sound waves reflecting off objects that are a different distance from the communication device.

The speaker 134 is configured to emit sound waves carried to one or more people in the vicinity of the communication device 100. The speaker 134 may be housed within case 110, or it may be remote from the case 110 and coupled to the communication device 100 through an appropriate I/O port (not shown) that may be wired or wireless. In one embodiment, the speaker 134 is part of a headset, or ear plug worn by a user of the communication device 100. In another embodiment, the speaker 134 is installed within case 110. For this purpose, the speaker 134, in one instance, may generate 70 dB of sound pressure level and be rated at 0.25 W of power. The speaker 134 chosen may vary depending upon the environment in which the communication device 100 is used. A louder, more powerful speaker 134 may be needed in some commercial or industrial settings, such as construction sites or manufacturing facilities. In general, any speaker that is suitable for the setting in which communication device 100 will be used may be chosen for inclusion in the communication device 100. The communication device 100, in one embodiment, has both an internal speaker 134 and an I/O port for an external speaker 134.

The audio-control microphone 136 is configured to capture sounds in the range made by a human voice. The audio-control microphone 136 may be configured to capture a human voice from several feet away. The audio-control microphone 136 may be housed within case 110, or it may be remote from the case 110 and coupled to the communication device 100 through an appropriate I/O port (not shown) that may be wired or wireless. In one embodiment, the audio-control microphone 136 is part of a headset worn by a user of the communication device 100. An internal audio-control microphone 136 should be functional to capture the voice of the person using the communication device 100, as well as sounds in the environment surrounding the person using the communication device 100. The communication device 100, in one embodiment, has both an internal audio-control microphone 136, and an I/O port for an external audio-control microphone 136.

The laser projector 138 is configured to project an image on a surface. The laser projector 138, should be small enough to be installed in communication device 100, energy efficient enough to run on battery 124, and bright enough to project an image on a surface in a variety of light environments. In one embodiment, the size of the laser projector 138 is 5 cubic centimeters, the power usage is 1.5 watts, the projection angle is 43×24, and the brightness is 10 to 15 lumens. The laser projector 138 may project an image with WVGA resolution, though many other resolutions are suitable. The laser projector 138 may have an adjustable focus configured to project a clear image at a range of distances.

The radio 144 is configured to communicatively couple the communication device 100 to one or more wireless networks. The radio 144 may use standard air interface protocols, such as code division multiple access ("CDMA"), global system for mobile communications ("GSM"), time division multiple access ("TDMA"), and/or WiMAX as well as others, to communicate with a wireless network. The radio 144 may be functional to communicate voice, data, and multi-media content, including VOIP.

The attachment ring 190 is configured to facilitate attaching the communication device 100 to a user's body. For example, the communication device 100 could be attached to a lanyard and worn around the user's neck. The lanyard could be attached to communication device 100 using the attachment ring 190. This is just one example of an attachment method, and other methods may be used as those of skill in the art will appreciate.

The docking port 142 may be configured to recharge the battery 124 in the communication device 100 (via a power channel) and/or to transfer data to the communication device 100 (via one or more data channels). The docking port may be connected directly with a computing device. The docking port may also be connected to one or more networks, including the Internet.

The case 110 may be constructed of any suitable material. Ideally, the choice of material will be based on a combination of the lightest material that is sturdy enough to stand up to the intended application. In one embodiment, the case 110 is generally the size of a mobile phone. The case 110 may be small enough and light enough that it can be comfortably worn as a badge by a user.

Figure 2:
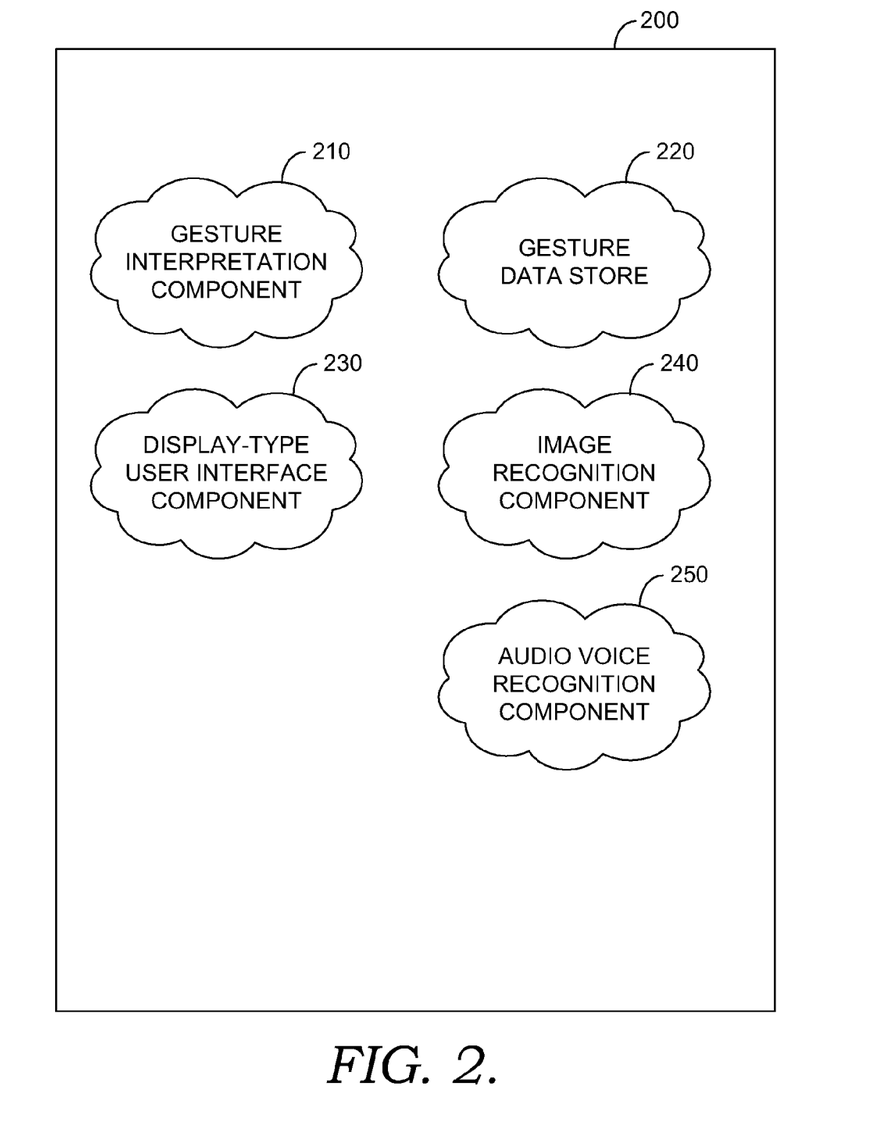
FIG. 2 is a block diagram of an exemplary system architecture suitable for operating a communication device with a gesture-controlled user interface, in accordance with an embodiment of the present invention.

Turning now to FIG. 2, a block diagram is illustrated that shows exemplary system architecture 200 suitable for operating a communication device 100 with a gesture-controlled user interface, in accordance with an embodiment of the present invention. It will be understood and appreciated by those of ordinary skill in the art that system architecture 200 is merely an example of one suitable architecture and is not intended to suggest any limitation as to the scope of the use or functionality of the present invention. Neither should the system architecture 200 be interpreted as having any dependency or requirement related to any single component or combination of components illustrated therein.

System architecture 200 includes a gesture interpretation component 210, a gesture data store 220, a display-type interface component 230, an image recognition component 240, and an audio voice recognition component 250. System architecture 200 may reside on a single communication device 100, such as communication device 100 shown in FIG. 1. In the alternative, system architecture 200 may be distributed over one or more communication devices, and/or computing devices over a wireless connection. The one or more communication devices and/or computing devices may be communicatively coupled with one another via one or more networks. Such networks may include, without limitation, one or more local area networks (LANs) and/or one or more wide area networks (WANs). Such network environments are commonplace in offices, enterprise/wide computer networks, intranets and Internet. Accordingly, the network, or combinations of networks is not further described herein.

The gesture interpretation component 210 is configured for interpreting gestures made by a user of the communication device 100. A gesture is a signal made by the user that has communicative content. For example, the user may perform a gesture by moving their finger in the outline of a letter or number. Other gestures could be used to control features of the communication device 100, such as display focus, volume, or power. The gesture does not have to involve touching of the communication device 100, but rather the gesture should be made in view of the communication device 100. A gesture is made in view of the communication device 100 if data describing the gesture may be received by one or more spatial recognition components that are connected to the communication device 100. The communication device 100 may include one or more spatial recognition components including a digital camera 126, a microphone array 132, and/or an echo location subsystem 128. Thus, a gesture is in view of the digital camera 126 if the camera's sensor can capture light reflecting off the object used to make the gesture. A gesture is in view of the echolocation subsystem 128 if the subsystem microphone can capture sounds reflected off of the object used to make the gesture. Similarly, a gesture is in view of the microphone array 132 if the array speakers can capture sound from the transducers used to make the gesture. The view range of each spatial recognition component may differ. A gesture does not need to be made in view of all of the spatial recognition components to be in view of the communication device 100. If a gesture is made in view of any of the spatial recognition components, it is made in view of the communication device 100. As stated before, the communication device 100 does not need to have all three of these spatial recognition components and may have only one or two of the components.

Interpreting a gesture involves identifying the gesture made by the user and assigning a meaning to it. The gesture interpretation component 210 identifies the gesture by performing calculations on data received from one or more spatial recognition components including the digital camera 126, the echolocation subsystem 128, and the microphone array 132. The result of the calculations is the two or three dimensional coordinates of the object performing the gesture. The coordinates, which describe the movement and location of the object performing the gesture, are compared with gesture patterns within gesture data store 220. A best-fit algorithm may be used when comparing the coordinates with the gesture patterns in gesture data store 220. Having identified the gesture, the meaning of the gesture is then retrieved from gesture data store 220. If the gesture is not recognized the gesture interpretation component 210 may record it as a drawing file. The gesture interpretation component 210 may also be configured to determine when the performance of a first gesture stops and the performance of a second gesture begins.

Gesture data store 220 is configured to store a list of gestures with an associated meaning for each gesture. Gestures may be pre-programmed, or may be added by a user. Additionally, the Gestures may be adjusted to match the tendencies of a particular user. The adjustment process may be implements by a machine learning application. The meaning associated with a particular gesture may also be changed by the user. Gesture data store 220 may be accessed by the gesture interpretation component 210 and other programs on the communication device 100. In addition, the gesture data store 220 may be accessed by other computers that are communicatively coupled to the communication device 100 through a wireless network, USB port 140 or other means. The gesture data store may be updated using user interfaces such as a keyboard, key pad, touch screen, etc. that may be included on communication device 100 or other device communicatively coupled to the communication device 100.

The display-type interface component 230 is configured to project a user interface through the laser projector 138. The user interface may contain pictures, words, videos, or any other subject matter that is possible to display on a TV or computer monitor. In one embodiment, the user interface is informational only in that it conveys content to the user, but does not receive content in return. In another embodiment, the display-type interface component 230 works with the gesture interpretation component 210 to provide an interactive interface. With an interactive user interface the user's gestures are interpreted in relation the projected interface. For example, the gesture could be interpreted as pushing a button on the projected interface. This process will be explained in more detail hereafter.

The image recognition component 240 is configured to recognize gestures made in view of the digital camera 126. The image recognition component 240 may analyze the image produced by the digital camera 126. The image recognition component 240 may break down the image into various descriptors. Descriptors include sharp edges, soft edges, colors, large blocks of colors, and other such identifying features associated with the image. The descriptors found in the image are then compared with the descriptors associated with a gesture in gesture data store 220.

The audio recognition component 250 is configured to recognize voice commands received through the audio recognition microphone 136. The audio recognition component 250 may be trained to better recognize the voice commands of individual users.

Figure 3:
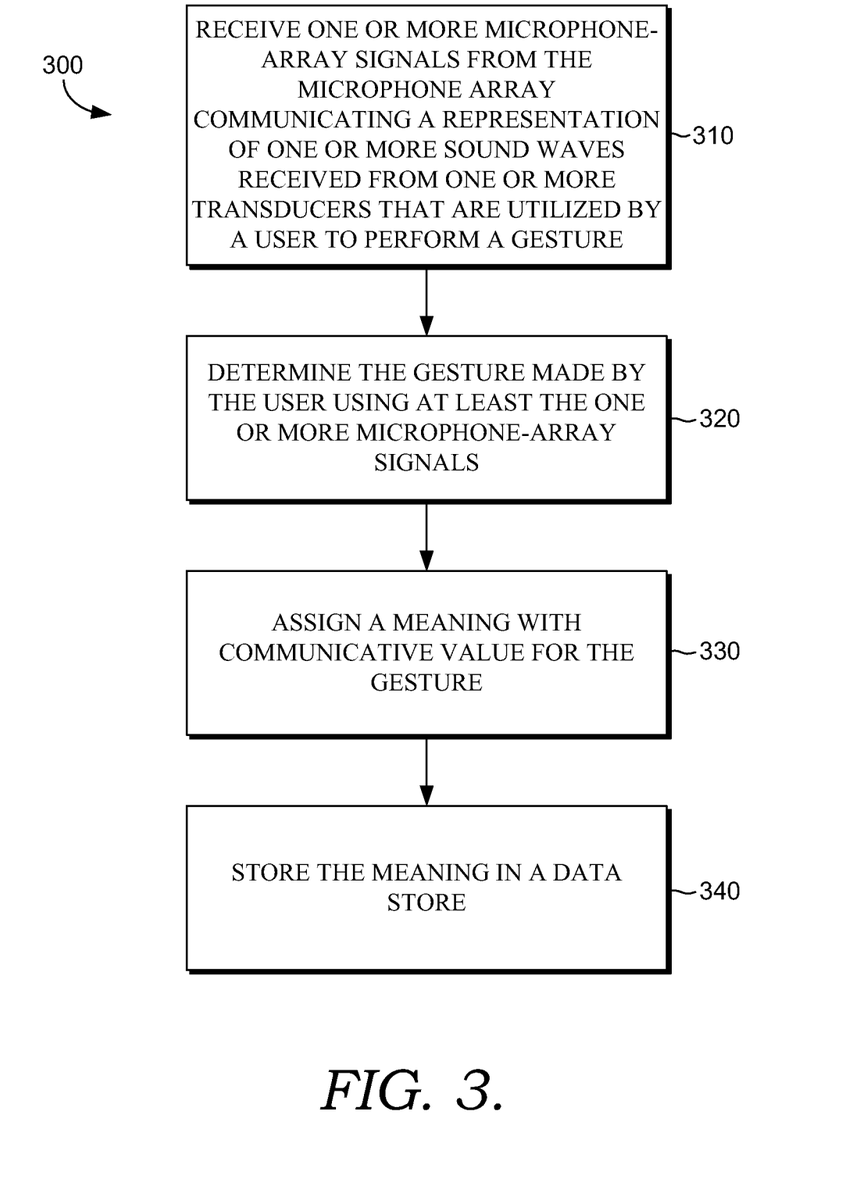
FIG. 3 is a flow diagram illustrating an exemplary method for providing a gesture-controlled user interface in interacting with a communication device, in accordance with an embodiment of the present invention.

With regard to FIG. 3, a flow diagram showing an exemplary method for providing a gesture-controlled user interface to interface with a communication device 100 is illustrated and designated generally as reference numeral 300. At step 310, one or more microphone-array signals are received. The microphone-array signals communicate a representation of one or more sound waves received by the microphone array 132. The sound waves received by the microphone array 132 originate with one or more transducers that are not connected to the communication device 100. In one embodiment, the one or more transducers are removably attached to the user of the communication device 100. The transducers may be attached to the user's fingers, or other body part that is used to make a gesture. In one embodiment, the microphone array 132 captures a gesture made by the user with at least one transducer removably attached to the user's hand.

The transducers may contain a speaker, a microprocessor, a signal generator, a power source such as a battery 124. In one embodiment, the transducer speaker is made of piezoelectric ceramics, optimized for generating sounds in the ultrasonic frequency range and for operating on relatively low power. If the transducer is attached to the body, the transducer should face the microphone array 132, so that that transducer signal is not blocked by the user's body part. The transducer may be mounted on a structure that facilitates attaching the transducer to the user's hand or body. In one embodiment, a Velcro strap is used to attach the transducer to the user. If more than one transducer is used, it may be desirable to preset each transducer to transmit at unique frequencies to improve recognition of the individual transducers. The transmission frequency of the transducers may also be adjustable to allow for differentiation between transducers. Using different frequencies also helps reduce acoustic interference.

At step 320, the gesture made by the user is identified using, at least, the one or more microphone-array signals received at step 310. The gesture is identified by performing calculations on the microphone-array signals. The result of the calculations is the two or three dimensional coordinates of the object performing the gesture. The coordinates, which describe the movement and location of the one or more transducers used to perform the gesture, are compared with gesture patterns in a list of gestures, such as within gesture data store 220. A best-fit algorithm may be used when comparing the one or more signals with the gesture patterns. The gesture patterns may also be optimized to better recognize gestures made by a specific user. The identification of the gesture may be improved by combining data gathered from an echolocation subsystem 128, and/or a digital camera 126

At step 330, the meaning of the gesture made is determined. In one embodiment, the meaning of the gesture is retrieved from a list of gestures associated with a meaning, such as gesture data store 220. The list of gestures may be expanded or modified to meet the user's needs.

At step 340, the meaning of the gesture is stored in a gesture data store 220. The meaning of the gesture may then be sent to, or retrieved by, an appropriate program including an operating system. In one embodiment, a function on the communication device 100 is controlled in response to the gesture.

In one embodiment, the communication device 100 is configured to respond to voice commands in addition to the gesture interface. For example, the communication device 100 could be turned on or off with a voice command. In another embodiment, other user interfaces such as a keypad, keyboard, and/or touch screen are included on the communication device 100. A display screen, such as an LCD screen, may also be included within communication device 100 and configured to present visual information to the user.

Figure 4:
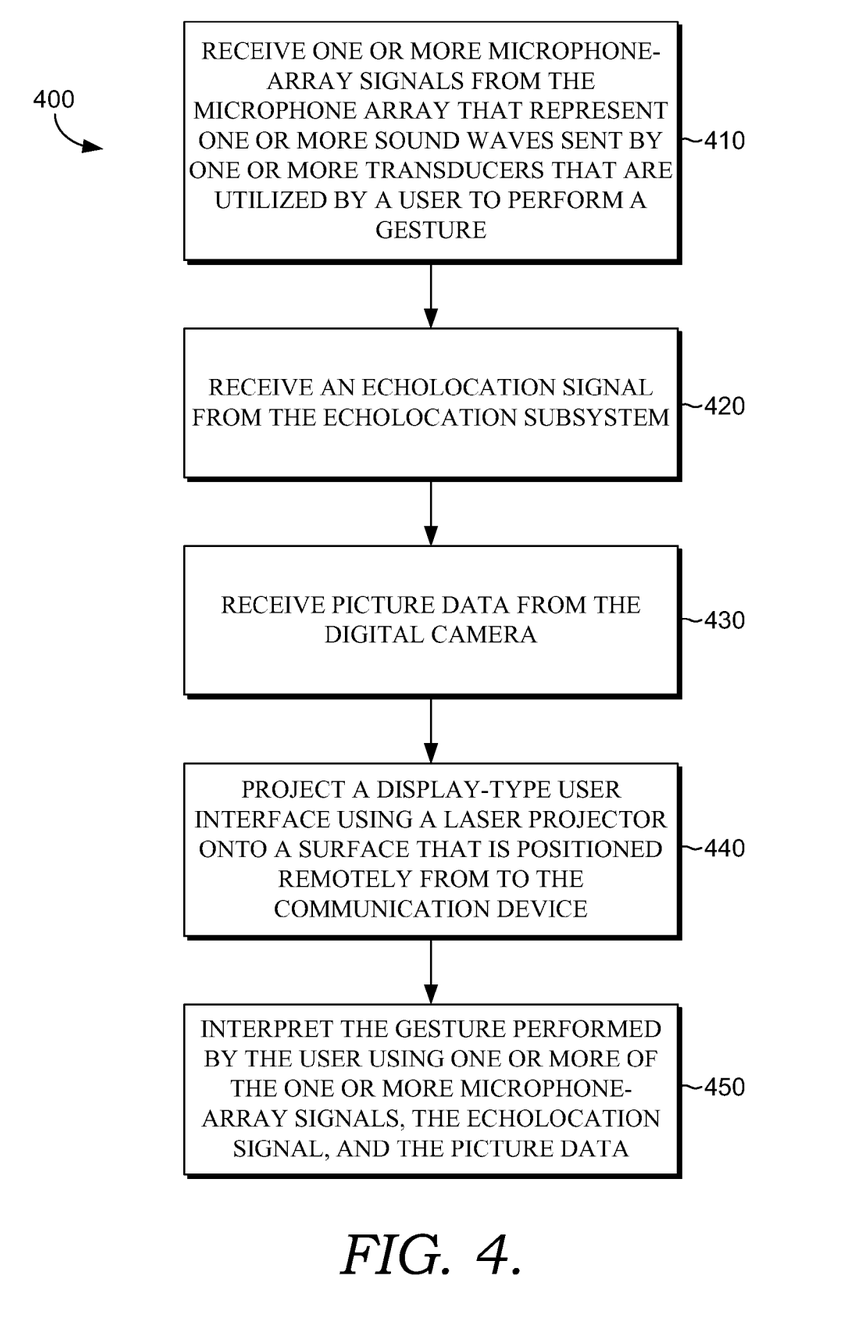
FIG. 4 is a flow diagram illustrating an exemplary method for providing a gesture-controlled user interface in interacting with a communication device that includes a laser projector, in accordance with an embodiment of the present invention.

With regard to FIG. 4, a flow diagram showing an exemplary method for providing a gesture-controlled user interface to interface with a communication device 100 that includes a laser projector 138 is illustrated and designated generally as reference numeral 400. At step 410, one or more microphone-array signals that communicate a representation of one or more sound waves received by the microphone array 132 are received. The sound waves received by the microphone array 132 are transmitted by one or more transducers that are not connected to the communication device 100. As explained previously, the one or more transducers may be removably attached to the user of the communication device 100. The transducers may be attached to the user's fingers, or other body part that is used to make a gesture. In one embodiment, the microphone array 132 captures a gesture made by the user with at least one transducer.

At step 420, a signal from the echolocation subsystem 128 is received. The signal from the echolocation subsystem 128 may represent the sound waves that were transmitted from the subsystem's speaker, reflected off of the user's hand while making a gesture, and captured by the subsystem's microphone. At step 430, picture data is received from a digital camera 126. The picture data may capture the performance of a gesture by the user.

At step 440, a user interface is projected onto a surface using a laser projector 138 that is part of the communication device 100. The user interface may display pictures, words, videos, or a variety of media content. The interface may be projected onto any surface desired by the user that is positioned remotely from the communication device 100. Thus, the surface is not part of the communication device 100 or connected to it. For example, the user interface may be projected onto a wall, a piece of equipment, a person's body, a projection screen, and/or a clip board. In one embodiment, the user interface displays input controls that may be virtually interacted with by the user performing a gesture in relation to the projected input controls on the user interface. For example, the user may select a button on the user interface by making a gesture that appears to touch the button on the projected image. The user's gesture is interpreted in relation the projected interface, and interpreted by communication device 100 as if the button on the user interface was pushed.

At step 450, a gesture made relative to the projected user interface is interpreted using data received from one or more of the microphone array 132, the echolocation subsystem 128, and the digital camera 126. As described above, interpreting the gesture involves identifying the gesture and assigning a meaning to it. The interpretation may be based solely on data from any one of the three spatial recognition components. The interpretation may also be based on a combination of two or more components. The digital camera 126 may identify the gesture in combination with an image recognition component 240 that analyzes the image produced by the digital camera 126. The image recognition component 240 may break down the image into various descriptors. Descriptors include sharp edges, soft edges, colors, large blocks of colors, and other such identifying features associated with the image. The descriptors found in the image are then compared with the descriptors associated with a gesture. As stated, the digital camera 126 may be used by itself to identify some gestures. In other instances, it may provide information that is used in conjunction with the information gathered by analyzing the signals from the microphone array 132 or echolocation subsystem 128. For example, the image recognition component 240 may be able to determine four transducers are worn on a single hand. This information may be used to alert the communication device 100 that it should be analyzing four or more signals from the microphone array 132 when evaluating the gesture.

The echolocation subsystem 128 may also be used as a stand alone spatial recognition component to gather data that describes the gesture. Specifically, the echolocation subsystem 128 provides a signal that represents the sound waves reflected off of the hand performing the gesture. This signal may be used to establish three dimensional coordinates that describe the objects position and movements. These coordinates could be compared with a list of coordinate movements that are associated with individual gestures. In one embodiment, the gesture determination made using the echolocation subsystem 128 signal is compared with the determination made using the one or more signals from the microphone array 132. If both determinations are the same, then the identification is deemed conclusive. On the other hand, if the two determinations are different, then processes may be employed to reconcile the two determinations to arrive at a final identification. In another embodiment, the combined signals are analyzed together to identify the gesture. Using information gathered by the digital camera 126, echolocation subsystem 128, and microphone array 132 to identify the gesture improves the accuracy of the gesture identification process.

In one embodiment, the user interface is projected onto a movable surface such as a clipboard or hand. Transducers may be attached to the one or more locations on the movable surface. In this embodiment, the movement of the surface controls one or more display characteristics. For example, the user interface may be scrolled up or down (i.e. in the y axis) or side to side (i.e. in the x axis), or front to back in the z axis. Scrolling in the z axis is particularly usefully when a three dimensional object is displayed on the user interface. For example, an architectural drawing could be displayed on the user interface and scrolled through a layer at a time by moving the surface towards the user or away from the user. In another example, a CAT Scan is displayed and scrolled through a layer at a time by moving the surface towards or away from the user.

Figure 5:
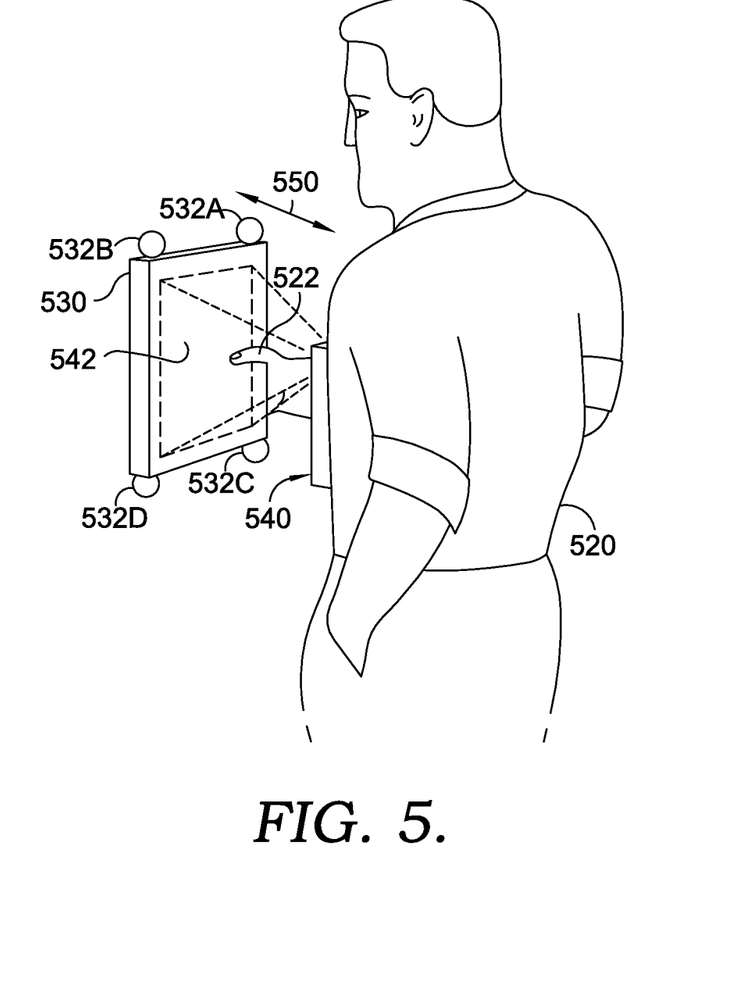
FIG. 5 is an illustration that shows controlling the user interface by moving the surface upon which the user interface is projected, in accordance with an embodiment of the present invention.

In FIG. 5, an illustration of controlling the user interface 542 by moving the surface 530 upon which the user interface 542 is projected is shown, in accordance with an embodiment of the present invention. The user 520 is shown holding a movable surface 530 in the users hand 522. The movable surface 530 is shown with transducers 532A, 532B, 532C, and 532D attached thereto. A user interface 542 is projected from communication device 540 onto the movable surface 530. The user interface 542 may be controlled, at least in part, by moving the movable surface 530 towards or away from the user 520 as illustrated by arrow 550.

Figure 6:
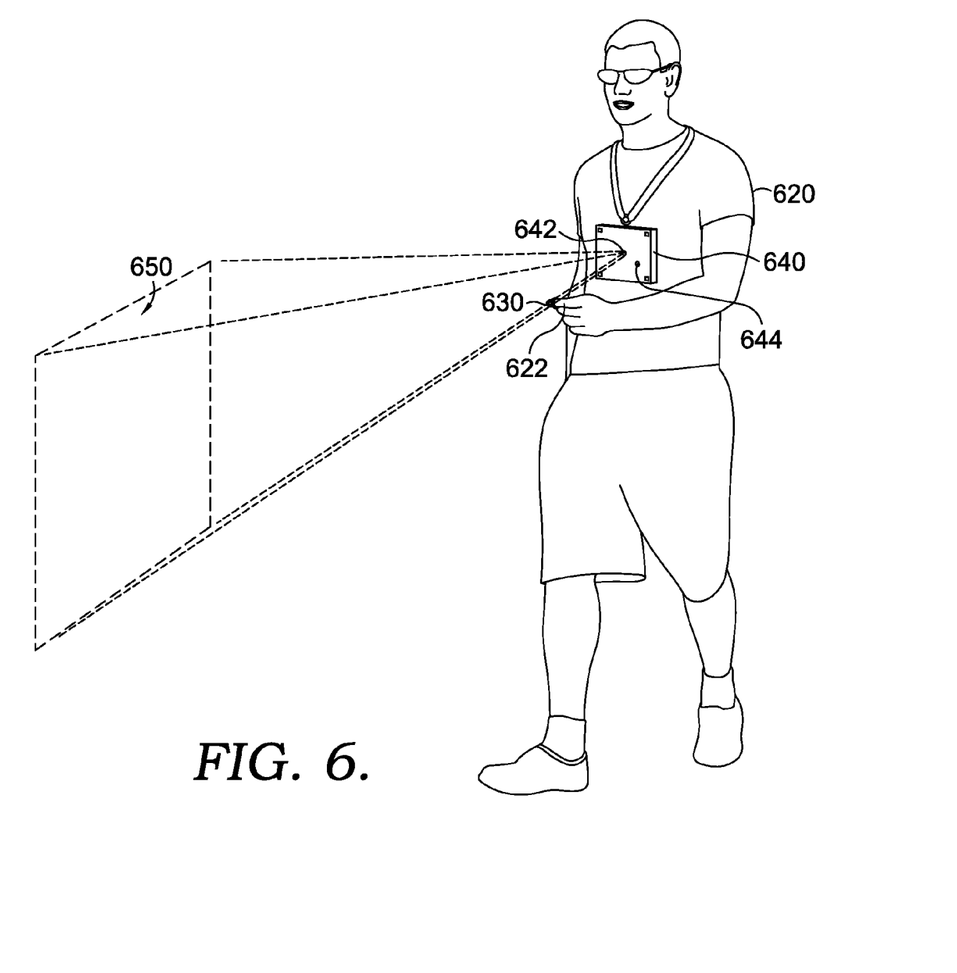
FIG. 6 is an illustration that shows taking a picture using a gesture interface, in accordance with an embodiment of the present invention.

In another embodiment, the laser projector 138 projects a frame onto the picture taking area of the digital camera 126. As the user makes changes to the zoom on the digital camera 126, the projected frame adjusts to the size of the picture taking area. In one embodiment, the user is able to take picture, and control other digital camera 126 functions by making a gesture. In FIG. 6, an illustration of taking a picture using a gesture interface is shown, in accordance with an embodiment of the present invention. The user 620 is shown wearing a communication device 640. The laser projector 642 in the communication device 640 is projecting a grid 650 that frames in the picture taking area that would be captured by digital camera 644. The user may take the picture or adjust the zoom of the digital camera 644 by making a gesture with the transducer 630 that is removably attached to the user's finger 622.

Figure 7:
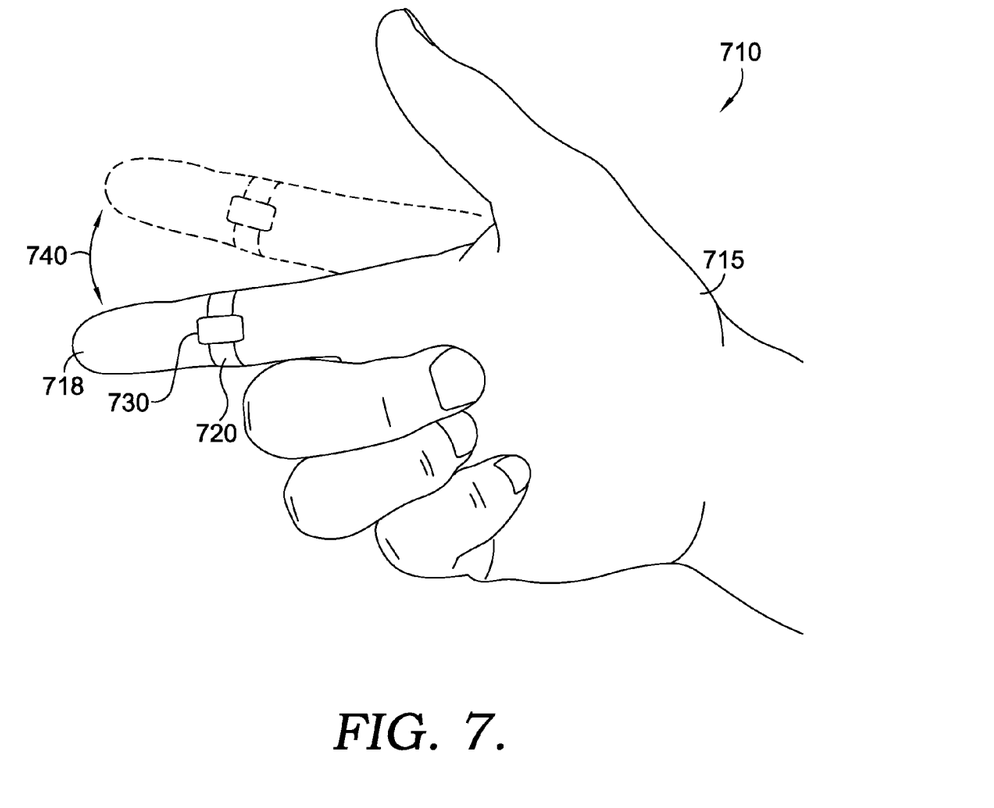
FIG. 7 is an illustration that shows the performance of a gesture using a transducer that is removably attached to a finger, in accordance with an embodiment of the present invention.

In FIG. 7, an illustration of the performance of a gesture 710 using a transducer 730 that is removably attached to a finger 718 is shown, in accordance with an embodiment of the present invention. In FIG. 7, a user's hand 715 is shown with a removably attached transducer 730 attached to the hand using strap 720. In this case, a single transducer 730 is attached to the index finger 718 of the right hand. Gesture 710 comprises moving the index finger 718 up and down. As explained above, this gesture 710 could be interpreted using signals from the microphone array 132. Gesture interpretation component 210 may receive a signal from the microphone array 132 that would allow it to identify the coordinate position and movement of transducer 730. The gesture interpretation component 210 would determine that the transducer 730 is moving up and down roughly two inches. Gesture interpretation component 210 would then search through gesture data store 220 to find a gesture that is consistent with moving the transducer up and down about two inches. Having identified the gesture 710, the gesture interpretation component 210 could then retrieve the meaning assigned to the gesture 710 in gesture data store 220. For example, gesture 710 may be the "on/off" gesture. Gesture interpretation component 210 would then assign the meaning to gesture 710 as an on/off command. The gesture interpretation component 210 could then communicate this command to the operating system or other component that would then take action based on receiving the on/off command. For example, the communication device 100 could turn on/off the communication device 100, or perhaps just an active component such as the laser projector 138, or camera 126. While the meaning of a particular gesture may remain static, the response to that gesture 710 could be different depending on the context in which the gesture 710 is received. For example, the gesture 710 could control the active application when one is running and the communication device 100 when no application is running.

Figure 8:
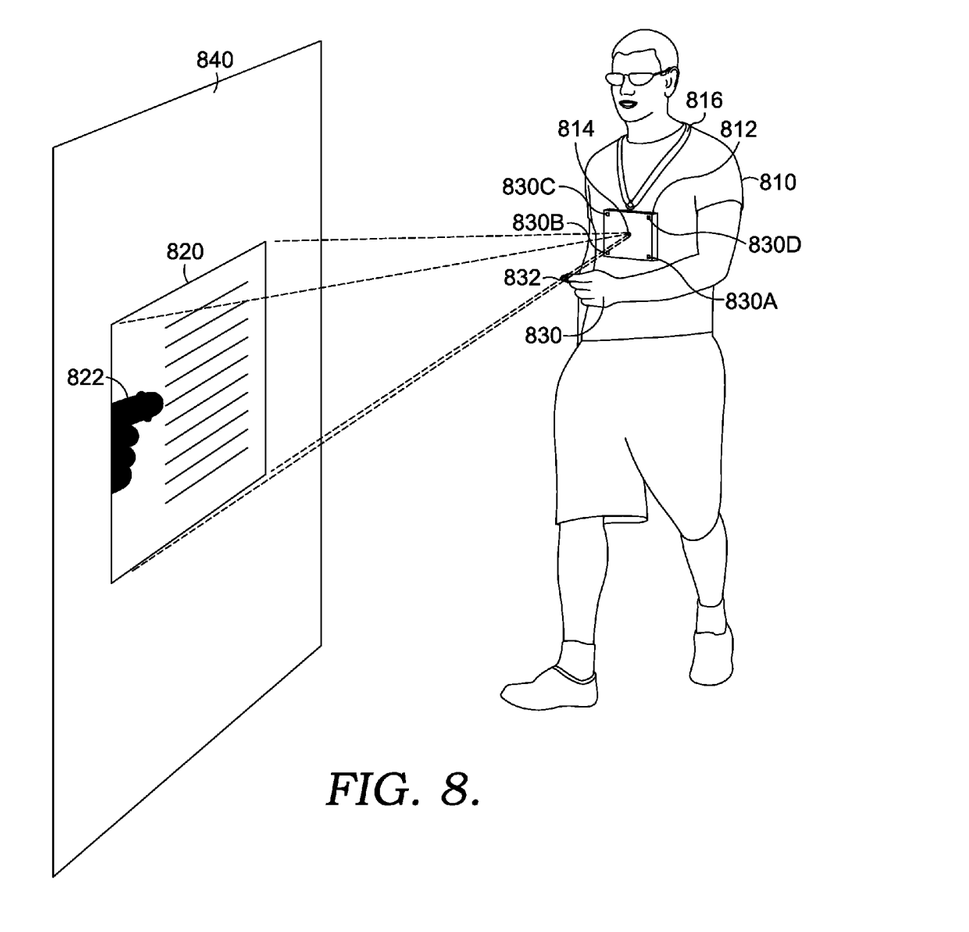
FIG. 8 is an illustration that shows the performance of a gesture made in relation to a projected user interface, in accordance with an embodiment of the present invention

In FIG. 8, a gesture made in relation to a projected user interface is illustrated, in accordance with an embodiment of the present invention. The user 810 is shown wearing a communication device 812. The laser projector 814 within the communication device 812 is projecting a user interface 820 onto a wall 840. The user's hand 830 partially blocks the projected user interface 820, creating a shadow 822 on the projected user interface 820. The user may virtually push a button, or select an object, on the user interface with the shadow 822. The communication device 812 may calculate the distance between the transducer 832 on the user's hand 830 and communication device 812. The communication device 812 may also calculate the distance between the projected user interface 820 and the communication device 812. Using this information, the communication device 812 can determine where on the screen the shadow 822 is projected and, therefore, what part of the projected user interface 820 the user 810 is intending to select or interact with. The sound waves transmitted by the transducer 832 may be received by microphones 830A, 830B, 830C, and 830D located on each corner of the communication device 812.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of providing a gesture-controlled user interface with a communication device that includes a microphone array and a laser projector, the method comprising:
   receiving one or more microphone-array signals from the microphone array communicating a representation of one or more sound waves received from one or more transducers that are positioned remotely from the communication device and are capable of being removably attached to a user and that are utilized by the user to perform a gesture comprising moving one or more fingers in the outline of a letter or a number;
   performing calculations on the one or more microphone-array signals received to generate two or three dimensional coordinates of the one or more fingers making the gesture;
   comparing the coordinates to gesture patterns in a data store using a best-fit algorithm; and
   identifying the gesture from matching gesture patterns in the data store and retrieving the associated meaning from the data store.

2. The one or more computer-readable media of claim 1, wherein the method further comprises:
   controlling a function of the communication device in response to the gesture.

3. The one or more computer-readable media of claim 1, wherein the method further comprises:
   projecting a display-type user interface onto a surface using the laser projector.

4. The one or more computer-readable media of claim 3, wherein the method further comprises:
   adjusting an appearance characteristic of the display-type user interface using one or more of:
   picture data received from a digital camera coupled to the communication device; and
   echolocation data received from an echolocation system coupled to the communication device.

5. The one or more computer-readable media of claim 1, wherein the method further comprises:
   receiving an echolocation signal from an echolocation subsystem that is coupled to the communication device; and
   determining the gesture made by the user using at least the one or more microphone-array signals and the echolocation signal.

6. The one or more computer-readable media of claim 5, wherein the method further comprises:
   receiving picture data from a digital camera that is coupled to the communication device; and
   identifying the gesture made by the user utilizing at least the one or more microphone-array signals, the echolocation signal, and the picture data.

7. The one or more computer-readable media of claim 1, wherein the method further comprises:
   projecting a display-type user interface onto a movable surface using the laser projector; and wherein the one or more transducers are connected to the movable surface.

8. The one or more computer-readable media of claim 1, wherein the method further comprises:
receiving a voice signal from a microphone embodying words spoken by the user; and
controlling a function on the communication device based on the voice signal.

9. One or more non-transitory computer-readable media having computer-executable instructions embodied thereon for performing a method of controlling a communication device having a laser projector, a microphone array, a digital camera, and an echolocation subsystem using gestures, the method comprising:
projecting a display-type user interface using a laser projector onto a surface that is positioned remotely from the communication device;
receiving an echolocation signal from the echolocation subsystem;
receiving picture data from the digital camera;
receiving one or more microphone-array signals from the microphone array that represent one or more sound waves sent by one or more transducers that are positioned remotely from the communication device and are capable of being removably attached to a user and that are utilized by the user to perform a gesture comprising moving one or more fingers in order to cast a shadow on the display-type user interface and pushing a virtual button or selecting an object on the display-type user interface with the shadow;
calculating the distance between the one or more transducers and the communication device;
calculating the distance between the display-type user interface and the communication device using the echolocation signal;
determining a location of the shadow relative to the user interface and what the user is intending to select; and
interpreting the gesture performed by the user using the one or more microphone-array signals and the picture data.

10. The one or more media of claim 9, wherein the method further comprises:
automatically controlling one or more appearance characteristics of the laser projector using the echolocation signal to determine a distance between the laser projector and the surface.

11. The one or more media of claim 10, wherein the method further comprises:
automatically controlling the one or more appearance characteristics of the laser projector using the picture data.

12. The one or more media of claim 9, wherein the method further comprises communicating one or more of voice and data over a wireless network using a radio coupled to the communication device.

13. The one or more media of claim 9, wherein the method further comprises:
receiving a picture taking gesture that instructs the communication device to take a picture with the digital camera; and
in response to the picture taking gesture, taking a picture with the digital camera.

14. The one or more media of claim 13, wherein the user interface comprises:
a grid that outlines a photograph area, wherein the photograph area represents an area to be captured on a photograph taken by the digital camera with a present zoom setting.

15. The one or more media of claim 9, wherein the method further comprises:
projecting the user interface using the laser projector onto a movable surface.

16. The one or more media of claim 15, wherein the method further comprises:
scrolling through a plurality of layers within a three dimensional representation projected on the user interface in response to moving the movable surface towards or away from the communication device.

17. A communication device with a gesture-controlled user interface, the communication device comprising:
a laser projector that is capable of displaying a user interface on a movable surface that is positioned remotely from the communication device;
a microphone array that is capable of receiving one or more sound waves transmitted from one or more transducers that are positioned remotely from the communication device and are capable of being removably attached to a user; and
a gesture interpretation component that evaluates the one or more sound waves received by the microphone array and determines a gesture made by the user with one or more transducers removably attached to the user, the gesture comprising moving one or more fingers in the outline of a letter or a number or up and down in view of the communication device,
the gesture interpretation component further performs calculations on the one or more microphone-array signals received to generate two or three dimensional coordinates of the one or more fingers making the gesture; compares the coordinates to gesture patterns in a data store using a best-fit algorithm; and identifies the gesture from matching gesture patterns in the data store and retrieving the associated meaning from the data store.

18. The communication device of claim 17, further comprising:
an ultrasonic echolocation subsystem that includes an incorporated transducer and an echolocation microphone; and
an ultrasonic echolocation component that determines at least a shape of an object, a size of the object, and a distance the object is from the communication device, using the one or more sound waves transmitted by the incorporated transducer and received by the echolocation.

19. The communication device of claim 17, further comprising:
a digital camera that generates a digital image.

20. The communication device of claim 17, further comprising one or more of the following:
an audio microphone;
a speaker;
an LCD display;
a touch screen;
a keyboard;
a keypad; and
a USB port.

* * * * *